United States Patent [19]

Faudou et al.

[11] Patent Number: 4,577,386

[45] Date of Patent: Mar. 25, 1986

[54] METHOD FOR MANUFACTURING A SLEEVE, IN PARTICULAR FOR A CONTAINER FOR STORING A CRYOGENIC FLUID

[75] Inventors: Jean-Yves Faudou, Villecresnes; Pierre Pelloux-Gervais, Seyssins, both of France

[73] Assignee: L'Air Liquide, Societe Anonyme pour l'Etude et l'Exploitation des Procedes Georges Claude, Paris, France

[21] Appl. No.: 625,175

[22] Filed: Jun. 25, 1984

[30] Foreign Application Priority Data

Jun. 24, 1983 [FR] France ............................... 83 10473

[51] Int. Cl.⁴ ........................ B21D 39/00; B23P 17/00

[52] U.S. Cl. ................................ 29/455 R; 29/421 R

[58] Field of Search .............. 29/455 R, 421 R; 62/45

[56] References Cited

U.S. PATENT DOCUMENTS 3,030,780 4/1962 Loveday .
3,280,608 10/1966 Parilla .
3,546,763 12/1970 Pasternak .......................... 29/421 R
4,061,184 12/1977 Radcliffe .
4,075,264 2/1978 Hayy ................................ 29/421 R
4,379,390 4/1983 Bottum ............................. 29/421 R

FOREIGN PATENT DOCUMENTS 2441664 3/1976 Fed. Rep. of Germany .
1246917 10/1960 France .
1429875 1/1966 France .

*Primary Examiner*—Howard N. Goldberg
*Assistant Examiner*—Steven Nichols
*Attorney, Agent, or Firm*—Young & Thompson

[57] ABSTRACT

The method comprises winding on a mandrel M a tube 1 having a flattened cross-sectional shape so as to form a helical structure, mounting on the mandrel and the tube a sheet metal cylinder 2, injecting in the tube a fluid under pressure so as to cause the tube to assume, by expansion, the shape of a coiled tube having a circular cross-sectional shape and thereby locally deform the wall of the cylinder in the shape of a helical impression, and fixing the coiled tube to the cylinder so as to produce the sleeve. The invention applies in particular to containers for cryogenic fluids provided with coiled heating tubes in an interwall space containing a vacuum between the sleeve and the internal tank.

13 Claims, 5 Drawing Figures

METHOD FOR MANUFACTURING A SLEEVE, IN PARTICULAR FOR A CONTAINER FOR STORING A CRYOGENIC FLUID

The invention relates to a method for manufacturing a sleeve of sheet metal, in particular for a container for storing a cryogenic fluid formed by a tank disposed in said sleeve and separated from the latter by an interwall space maIntained under a vacuum and at least one coiled heating tube placed in said interwall space.

Containers for storing cryogenic fluid usually comprise an internal tank and an external shell which are both of metal and separated by a sealed volume maintained under a vacuum and termed an interwall space.

The external shells of these containers are usually formed by a sheet metal cylindrical body closed at both ends by end walls and must be designed to resist atmospheric pressure and mechanical stresses. This is achieved by giving the sheet a sufficient uniform thickness or by providing the shell with evenly spaced apart stiffening means.

In some containers, the fluid is stored in the liquid state; the fluid is maintained under pressure by means of a "utilization" coiled heating tube and is vaporized before use by means of a "utilization" coiled heating tube, these two coiled tubes being placed in said interwall space against the outer wall. The interest of this arrangement is the use of the outer surface of the container as a thermal exchange element so that it is possible to achieve a very compact unit.

Containers employed at the present time have the drawback of having a prohibitive weight owing to the fact that they are provided with shells having a thick wall or a wall reinforced by stiffening means so as to resist atmospheric pressure and vertical forces resulting from the weight of the internal tank. It has been proposed to employ the coiled tube or tubes for stiffening the shell, but experience has shown that this use of the tubes with presently-known assembling methods does not result in a substantial saving.

An object of the present invention is to overcome the aforementioned drawbacks and consequently to provide a sleeve which is capable of resisting large stresses, whether they be due to atmospheric pressure or mechanical requirements, and is distinctly lighter than those obtained by prior methods.

The invention therefore provides a method for manufacturing a sleeve of sheet metal, comprising the following steps:

- winding on a radially expansible mandrel (respectively in a radially contractible mandrel) at least one metal tube having a flattened cross-sectional shape so as to produce a helical structure having a pitch p and an outside diameter (respectively inside diameter) $D_H$;
- mounting on (respectively in) the mandrel and the tube a sheet metal cylinder which has a circular cross-sectional shape and an inside diameter $D_{CI}=D_H+\epsilon$(respectively an outside diameter $D_{CO}=D_H-\epsilon$) so that the cylinder is a slide fit against said tube;
- applying the tube against the wall of the cylinder by expansion (respectively contraction) of the mandrel, and
- injecting into the flattened tube a fluid, in particular a hydraulic fluid, under sufficient pressure to cause the tube to assume, by expansion, the shape of a coiled tube having a circular cross-sectional shape and locally deform the wall of the cylinder in the shape of a helical impression.

The invention achieves the deformation, and consequently the stiffening, of the cylinder by means of the coiled tube and simultaneously incorporates the tube therein, the unit thus formed constituting the sleeve. This has the advantage of adding the inertias of the deformed cylinder and the coiled tube while benefiting from the stiffening produced by the cold working of the metal. Consequently, it is possible to use a sheet which is thinner than those which were used up to the present time.

If it is desired to ensure a good thermal contact between the tube and the cylinder, it is preferable to fix them together after said injection. In this case, advantageously, they are provided on their confronting surfaces, with a coating of tinning product, and said fixing is achieved by brazing. In this way, a sleeve is obtained which also ensures a resistance to buckling under optimum conditions.

The invention also provides a sleeve for a container for storing a cryogenic fluid produced by the method defined hereinbefore.

According to the invention, the wall of this sleeve has an outwardly projecting helical impression and the coiled tube is fixed to said wall in coincidence with said impression.

Further features and advantages of the invention will be apparent from the following description.

In the accompanying drawings which are given merely by way of example:

The object of the invention is to achieve a great stiffening of the sleeve by solely using the metal from which it is made and by deforming this metal so as to impart the desired stiffening thereto, which arrangement has the advantage of avoiding the addition of attached stiffeners and permitting the use of a thinner sheet than in the case of prior sleeves. Moreover, this deformation results in a cold hardening of the metal which substantially increases the stiffening.

The aforementioned deformation is achieved by using the heating coiled tube or tubes and incorporating them in the sleeve, so that the inertias of the deformed and work hardened sleeve and the coiled tube or tubes are added together.

Figures 1, 2:
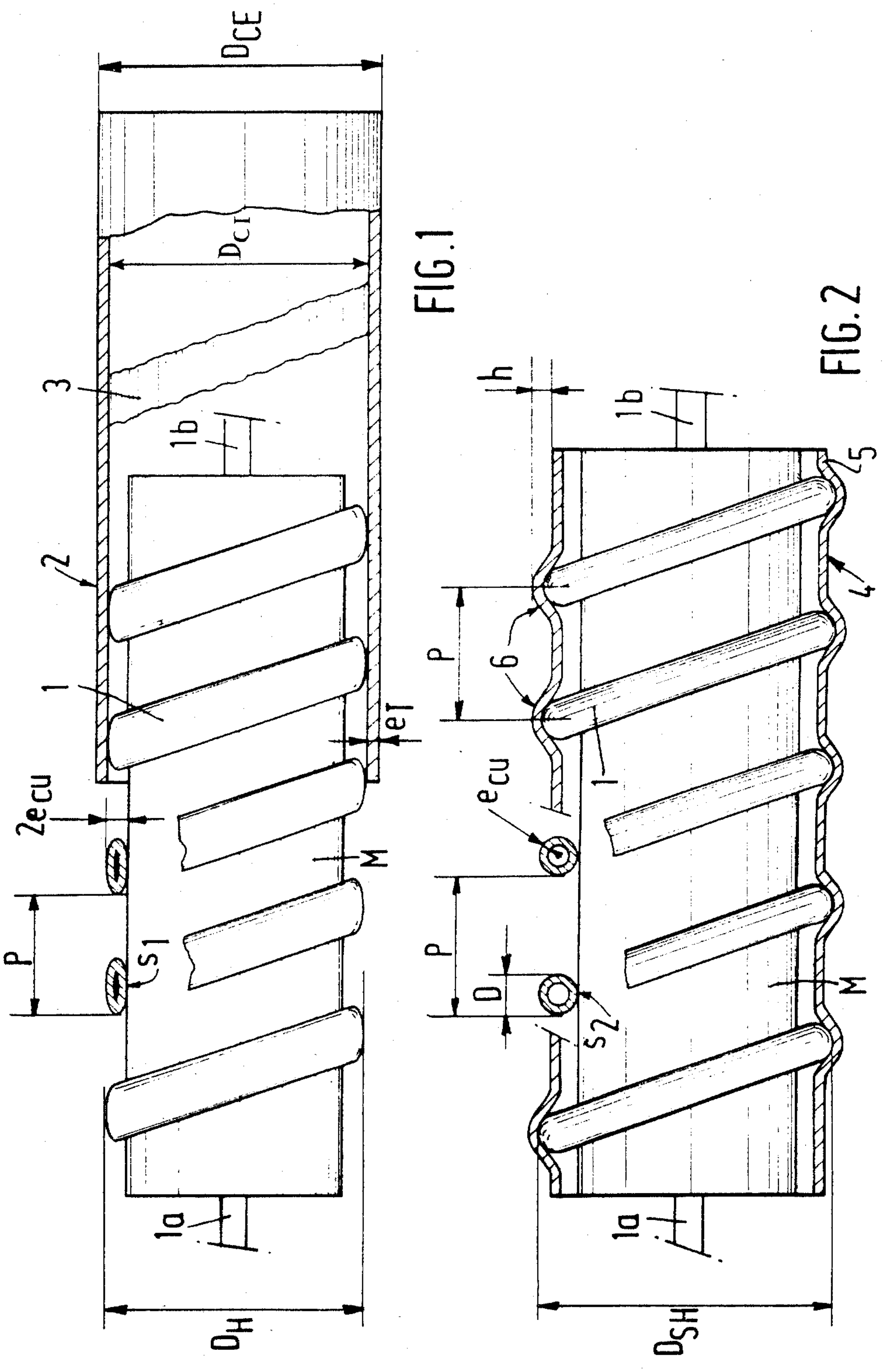
FIG. 1 is a diagrammatic sectional view, with a part cut away, of a sleeve in the course of manufacture by the method according to the invention.
FIG. 2 is a view identical to FIG. 1 showing a subsequent stage in the manufacture.

FIGS. 1 and 2 show two of the principal steps in the manufacture of the sleeve according to the invention which comprises the tube 1 and the cylinder 2. The tube 1 is made from a sufficiently malleable material, usually copper, and has a flattened cross-sectional shape $S_1$, i.e. its confronting walls are almost touching each other and define therebetween only a very small space which is just sufficient for the admission of a hydraulic fluid under high pressure. This tube may be obtained from an ordinary tube having a circular cross-sectional shape which is flattened by a drawing operation. Such a tube having a circular cross-sectional shape and a wall thickness $e_{cu}$ results in a flattened tube having a thickness $2e_{cu}$ after the drawing operation. The outer wall of the tube 1 in its flattened condition is then tinned by passing it through a suitable bath. The tube 1 covered with a coating of a tinning product is wound onto an expansible mandrel diagrammatically shown at M so as to form a helical structure of pitch p and an outside diameter $D_H$.

The cylinder 2 is made from a sheet which has a thickness $e_T$ and is of a metal having a high strength and a high resistance to corrosion, usually stainless steel. There is deposited on this sheet in the flat state a tinning product disposed along strips 3 corresponding to the developed helical structure of pitch p mentioned before. The sheet provided with the tinning coating is then rolled so as to form a cylinder having a circular cross-sectional shape, the two edges of the sheet being welded along a generatrix. The respectively inside and outside diameters of the cylinder 2 obtained are designated by the references $D_{CI}$ and $D_{CE}$. The inside diameter $D_{CI}$ is very slightly larger than the diameter $D_H$ of the helical structure formed by the flattened tube 1 ( $D_{CI}=D_H+\epsilon$).

The cylinder 2 is then mounted on the mandrel and the helical structure without difficulty owing to the slight difference between the inside diameter $D_{CI}$ and the diameter $D_H$. The cylinder is so positioned that the strips of tinning product 3 of its inner wall coincide with the wound flattened tube 1.

The mandrel M is then expanded radially and this applies the flattened tube 1 against the inner wall of the cylinder 2 and takes up any clearance and therefore prevents any relative movement between the tube and the cylinder in the course of subsequent operations.

The two ends $\mathbf{1}_a$ and $\mathbf{1}_b$ of the tube 1 are then connected to a device (not shown) supplying a hydraulic pressure P capable of expanding the tube 1 which assumes or resumes a circular cross-sectional shape $s_2$ having an outside diameter D and constitutes a coiled tube having an outside diameter $D_{SH}$. This expansion of the tube results in an expansion of the cylinder 2 which then assumes the shape shown at 4, i.e. the shape of a sleeve whose wall 5 has a helical impression 6 whose pitch p is equal to the pitch of the helical tube 1 before or after its expansion.

The unit constituted by the tube and the sleeve 4 is then withdrawn from the mandrel M after having rendered them temporarily interconnected (for example by brazing the two ends $\mathbf{1}_a$ and $\mathbf{1}_b$ of the tube to the sleeve 4) and this unit is placed in an oven at about 220° C. so as to cause the melting of the tinning material and thus ensure the brazing. The sleeve obtained is then rinsed.

A number of tests have been carried out for determining, in the case where the sleeve is obtained from a copper tube and a stainless steel sheet, the most appropriate values for the thickness and the diameter of the tube and the thickness of the sheet.

In adopting for the cylinder an outside diameter of 508 mm, which is a conventional value for usual containers storing cryogenic fluids, and a sheet thickness of between 1 and 1.5 mm capable of having sufficient resistance to buckling and to localized impacts to which this type of apparatus may be subjected, the following relations are determined experimentally:

$$\frac{e_{cu}}{D} = K \cdot \frac{e_T}{D_{CE}} \quad (1)$$

in which K=45, this value of K being imposed by the mechanical properties of the materials and $$\frac{D}{2} = h \quad (2)$$

in which h is the height of the impression projecting from the wall of the sleeve, i.e. the deflection of the helical impression 6 relative to the inital outside diameter $D_{CE}$ of the cylinder 2.

Calculations relative to the resistance to buckling gave:

h=6 mm

The solutions of the two equations (1) and (2) gave:

$e_{cu}$=1.6 mm

D=12 mm.

Figure 3:
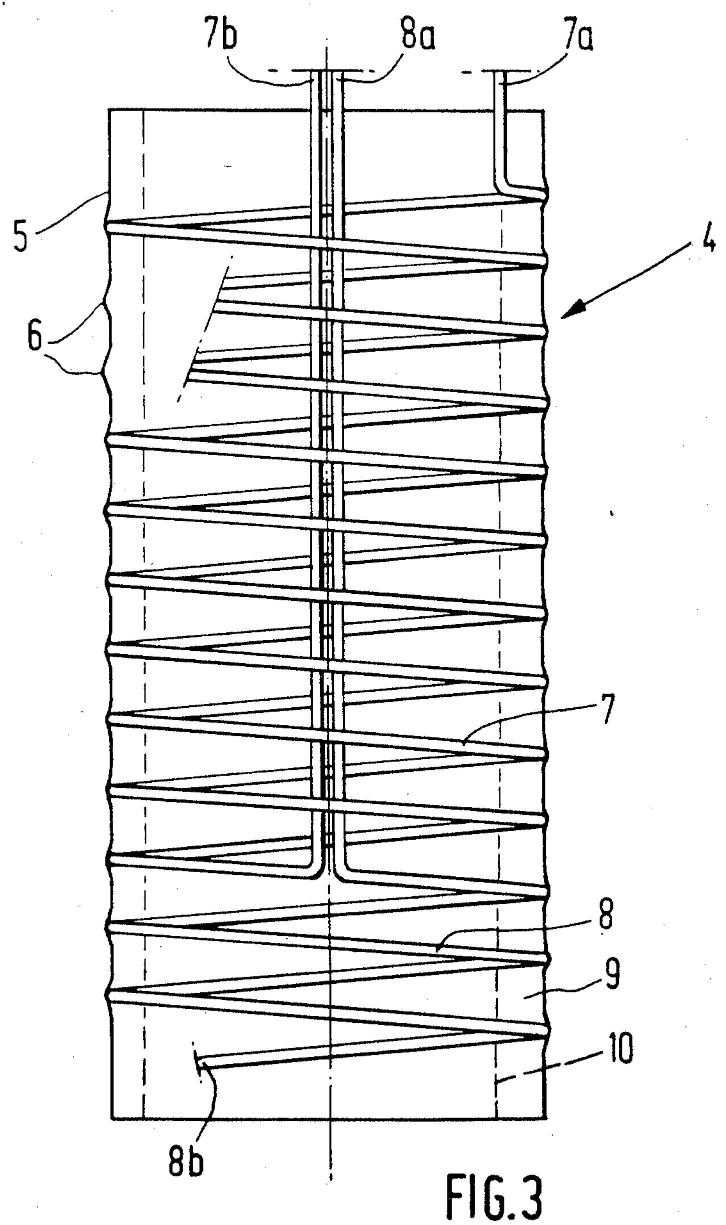
FIG. 3 is a diagrammatic view of a finished sleeve according to a first embodiment.
Figure 4:
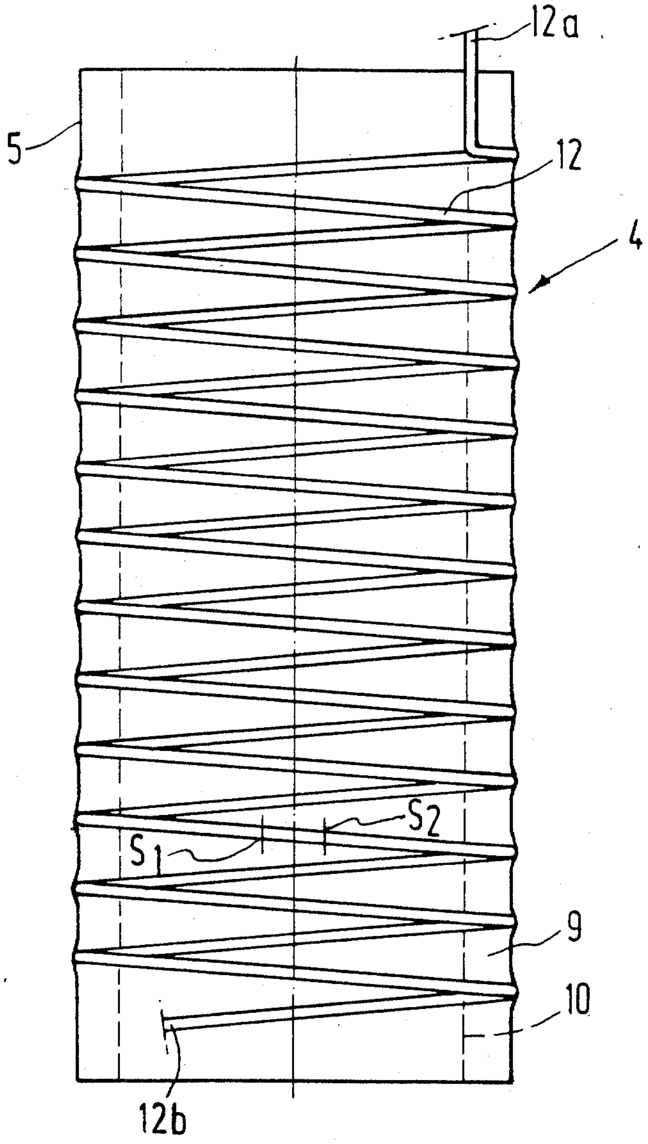
FIG. 4 is a diagrammatic view of a sleeve according to a second embodiment of the invention in the course of manufacture.
Figure 5:
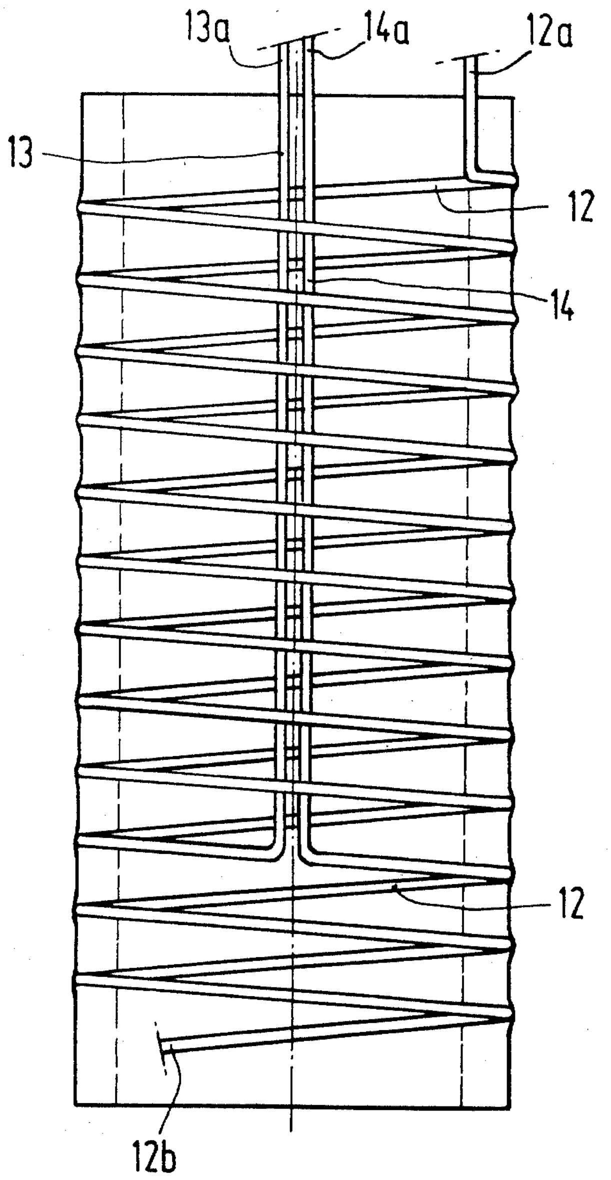
FIG. 5 is a view of the sleeve of FIG. 1 in its finished state.

FIGS. 3 to 5, in which the same reference characters designate the same elements as in FIGS. 1 and 2, show two different embodiments of a sleeve according to the invention.

The sleeve shown in FIG. 3 is made from a stainless steel cylinder and includes two copper helical tubes 7 and 8 whose two ends are designated by $\mathbf{7}_a$, $\mathbf{7}_b$ and $\mathbf{8}_a$, $\mathbf{8}_b$ and which constitute a utilization or withdrawing element and pressurizing element respectively. These two coiled tubes were obtained from two separate tubes which were wound onto the same mandrel, simultaneously or separately, but with the same pitch. In the finished sleeve, they are disposed one after the other and are located in the interwall space 9 between the sleeve proper and the internal tank 10.

The sleeve shown in FIGS. 4 and 5 is made with a single copper tube 12 whose ends are designated by $\mathbf{12}_a$ and $\mathbf{12}_b$ which, after brazing, is severed at two points $S_1$ and $S_2$ of one of the coils. Connected then to the two points $S_1$ and $S_2$ are two rectilinear elements 13 and 14 whose ends are designated by $\mathbf{13}_a$ and $\mathbf{14}_a$ respectively. There are obtained in this way a utilization coiled tube 12–13 and a pressurizing coiled tube 12–14, as in FIG. 3. This embodiment has the advantage of simplifying the various manufacturing operations and in particular the winding. It should be mentioned that the severing of the coil at points $S_1$ and $S_2$ is preferably carried out after the expansion operation.

By way of example, a sleeve according to the invention was constructed in the following manner:

The cylinder is made from a sheet of stainless steel Z5 CN 18.09 NFA 36209 (French standard) having a thickness of 1.5 mm. It is internally tinned along the developed line of a helix having a pitch of 80 mm at a width of 20 mm by means of a mixture of lead, tin, antimony and flux. It is then rolled so as to produce a cylinder having a circular cross-sectional shape and an outside diameter $D_{CE}$ of 508 mm.

The coiled tube (or tubes) is made from a tube of copper Cu 0 NFA SI 124 (French standard) have a circular cross-sectional shape and an outside diameter D of 12 mm and a thickness $e_{cu}$ of 1.6 mm. After flattening, the tube is provided on its outer surface with a coating of tinning product by dipping in a bath comprising a mixture 60% lead and 40% tin. The tube is wound onto the mandrel in a helix having a pitch of 80 mm which of course corresponds to that of the tinning of the cylinder. After expansion of the mandrel, the tube is expanded by connecting it to a hydraulic pressurizing device which supplies the tube with a liquid at a pressure of 500 bars. After expansion the two ends of the coiled tube are fixed to the sheet of metal, preferably by soldering, and the unit is withdrawn from the mandrel. It is then possible, in the case where a sleeve of the type shown in FIG. 5 is desired, to connect the required rectilinear elements. The sleeve is then placed in a brazing oven so as to bring it to a temperature of about 220° C. and then rinsed so as to remove foreign bodies coming from the brazing or other bodies.

Buckling tests carried out on the sleeves constructed in this way revealed that the buckling pressure was higher than 3*b*.

By way of comparison, it was also found that a sleeve which was not reinforced and had substantially the same dimensional characteristics, i.e. the same diameter (508 mm) and the same length (for example 1 m) must, in order to have an equivalent resistance to buckling and an equivalent resistance to impact, be made from a stainless steel sheet of the same type just mentioned but having a thickness of 2.5 mm.

Many modifications may be made in the described and illustrated embodiments without departing from the scope of the invention defined in the appended claims. Thus, for example. the brazing material could be deposited on the cylinder and the tube after the operation for expanding the tube under pressure. The tube may be fixed to the cylinder by means other than brazing, for example by welding. Further, it will be understood that the method may be adapted very simply to the manufacture of any sleeve provided with an internal coiled tube or even with an external coiled tube. In the latter case, it is sufficient to wind the copper tube or tubes in a radially contractible hollow mandrel.

What is claimed is:

1. A method for manufacturing a sleeve of sheet metal, in particular for a container for storing a cryogenic fluid, comprising a tank disposed in said sleeve and spaced from said sleeve by an interwall space containing a vacuum, and at least one coiled heating tube placed in said interwall space, said method comprising:

winding on a radially expansible mandrel at least one metal tube having a flattened cross-sectional shape so as to produce a helical structure having a pitch p and an outside diameter $D_H$;

mounting on the mandrel and the tube a sheet metal cylinder which has a circular cross-sectional shape and an inside diameter $D_{CI}=D_H+\epsilon$ so that the cylinder is a slide fit on said tube;

applying the tube against the wall of the cylinder by expanding the mandrel, and injecting into the flattened tube a fluid, in particular a hydraulic fluid, at a sufficient pressure to cause the tube to assume, by expansion, the shape of a coiled tube having a circular cross-sectional shape and thereby locally deform the wall of the cylinder in the shape of a helical impression.

2. A method according to claim 1, comprising fixing the coiled tube to the cylinder after said injection.

3. A method according to claim 2, comprising providing a coating of a tinning product on confronting surfaces of the tube and the cylinder and effecting said fixing of the coiled tube to the cylinder by brazing.

4. A method according to claim 3, comprising depositing the coating of the tinning product on a planar sheet which is adapted to form said cylinder after rolling along the development of the helical structure having said pitch p.

5. A method according to claim 1, for manufacturing a sleeve provided with two coiled tubes, comprising winding two tubes having a flattened cross-sectional shape separately on the mandrel.

6. A method according to claim 1, comprising severing the tube after said injection so as to form two coiled tubes.

7. A method according to claim 1, the sleeve being formed by a cylinder of a sheet of stainless steel and a helical tube formed by a copper tube which has a circular cross-sectional shape after expansion, wherein the following relations are obtained:

$$\frac{e_{cu}}{D} = K \cdot \frac{e_T}{D_{CE}} \quad (1)$$

$$\frac{D}{2} = h \quad (2)$$

in which:

$e_{cu}$=thickness of the copper tube

D=outside diameter of the copper tube $e_T$=thickness of the sheet $D_{CE}$=outside diameter of the cylinder K=45 (for 1 mm$<e_T<$1.5 mm)

h=deflection of the impression on the wall of the sleeve.

8. A method for manufacturing a sleeve of sheet metal provided with at least one coiled tube, said method comprising:

winding in a radially contractible mandrel at least one metal tube having a flattened cross-sectional shape so as to produce a helical structure having a pitch p and an inside diameter $D_H$;

mounting in the mandrel and the tube a sheet metal cylinder which has a circular cross-sectional shape and an outside diameter $D_{CO}=D_H-\epsilon$ so that the cylinder is a slide fit in said tube;

applying the tube against the wall of the cylinder by contracting the mandrel, and injecting into the flattened tube a fluid, in particular a hydraulic fluid, at sufficient pressure to cause the tube to assume, by expansion, the shape of a coiled tube having a circular cross-sectional shape and thereby locally deform the wall of the cylinder in the shape of a helical impression.

9. A method according to claim 8, comprising fixing the coiled tube to the cylinder after said injection.

10. A method according to claim 9, comprising providing a coating of a tinning product on confronting surfaces of the tube and the cylinder and effecting said fixing of the coiled tube to the cylinder by brazing.

11. A method according to claim 10, comprising depositing the coating of the tinning product on a planar sheet which is adapted to form said cylinder after rolling, along the development of the helical structure having said pitch p.

12. A method according the claim 8, for manufacturing a sleeve provided with two coiled tubes, comprising winding two tubes having a flattened cross-sectional shape separately in the mandrel.

13. A method according to claim 8, comprising severing the tube after said injection so as to form two coiled tubes.

* * * * *